(Model.)
A. WEBER.
Hand Piece for Dental Engines.
No. 231,945. Patented Sept. 7, 1880.
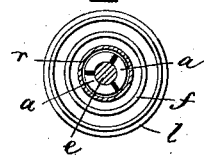
Fig: 2.
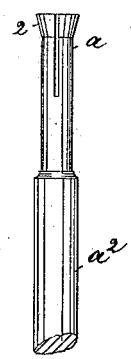
Fig: 3.
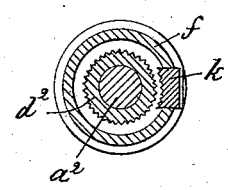
Fig: 4.
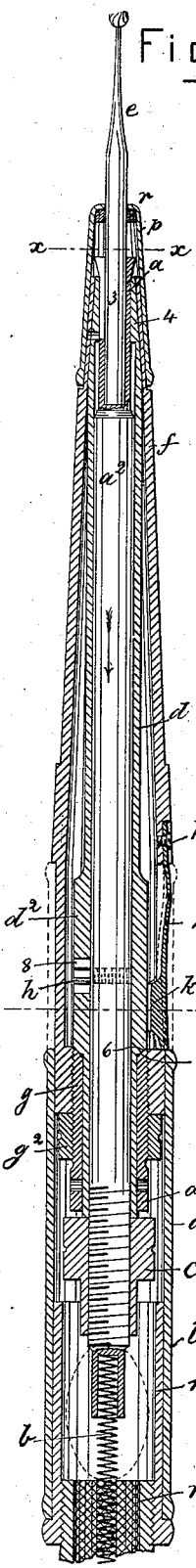
Fig: 1.
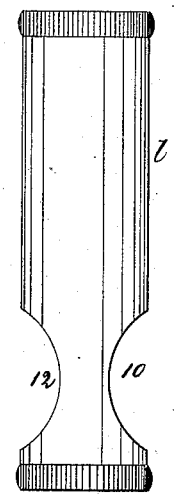
Fig: 5.
Witnesses.
L. F. Connor.
V. D. Dearborn.
Inventor.
August Weber,
by Crosby & Gregory
Attys

UNITED STATES PATENT OFFICE.

AUGUST WEBER, OF NEW YORK, N. Y., ASSIGNOR TO GEO. E. HODGE.

HAND-PIECE FOR DENTAL ENGINES.

SPECIFICATION forming part of Letters Patent No. 231,945, dated September 7, 1880.

Application filed May 10, 1880. (Model.)

*To all whom it may concern:*

Be it known that I, AUGUST WEBER, of the city, county, and State of New York, have invented an Improvement in Hand-Pieces for Dental Engines, (Case C,) of which the following description, in connection with the accompanying drawings, is a specification.

This invention relates to hand-pieces for dental engines, and has for its object a construction thereof, substantially as hereinafter described, whereby the tool may be readily inserted in the chuck and be grasped and rotated positively, or be detached therefrom, the chuck grasping the shank of the tool at any part and holding it firmly.

My invention consists, essentially, in an outer casing, a rotating sleeve having its bearings therein, and a tool-holding chuck, the shank of which is screw-threaded, as described, combined with a chuck-adjusting nut arranged to bear against a shoulder in the sleeve and draw the chuck horizontally back into the sleeve, causing the inclined jaw of the chuck to grasp and hold the tool firmly while being rotated.

In this my improved hand-piece the chucking-jaws, normally held open by their own elasticity, and inclined or beveled externally, are formed or connected with a rod provided with a screw-thread to receive a nut that may be turned and made to act against the rear end of the rotating sleeve that surrounds the chuck and its rod, so that the said rod and chuck, by movement of the said nut, are drawn positively back into the sleeve to thus clamp and hold the shank of the tool at any part thereof without liability to slip, which is the case where a spring is depended upon to draw the said rod and chuck into the sleeve. I have provided the forward end of the sleeve with a bearing portion tapered externally to fit a tapering surface in the casing, and near the rear end of the sleeve I have made a tapering or conical shoulder, to be acted upon by the tapering or conical end of a screw-threaded bushing, which also serves as a bearing for the sleeve, so that the said conical shoulder and bearing co-operate together to hold and center the sleeve in the casing, and also enables all wear to be taken up, which is not the case with a shoulder and bushing having squared surfaces or faces, as heretofore common.

By extending the chuck entirely through the casing and rotating sleeve, and making the chuck independently movable longitudinally, I am enabled to cause the chuck to grasp any part of the round shank of the tool, be it more or less distant from its working end, and hold it firmly, which is not the case in hand-pieces wherein the shank of the tool is notched or grooved to be grasped by the chuck only at one part.

The rotating sleeve herein described will have its bearings hard-soldered into the central part of the sleeve, so as to form practically one piece therewith; or, if desired, the central part and bearing at its end may be made of one piece, and, if desired, this one-piece sleeve could be made in two pieces, each of equal length.

Figure 1 represents, in longitudinal section, a hand-piece containing my improvements, it being shown as grasping a tool, the presser being shown in full lines in its normal position and in dotted lines in its depressed position, the shield being shown in full lines in its most backward position and in dotted lines in its forward position to depress the presser. Fig. 2 is a section of Fig. 1 on the dotted line $x\ x$; Fig. 3, a separate enlarged detail of one end of the chuck-carrying rod removed from its sleeve; Fig. 4, a section on the line $y\ y$, Fig. 1; and Fig. 5, an enlarged separate detail of the shield turned one-fourth around from the position occupied by it in Fig. 1, to thus show the opening through it, to enable the adjusting-nuts of the chuck to be turned when the sleeve is forward and depressing the presser.

The rear end of the shield is made to fit over a tubular guide-piece connected and moving with the flexible shaft, so that the shield in all positions occupied by it is always held and guided by the said guide-piece, so that when the tool is being rotated, and the shield drawn back, the guide-piece stops the openings in the said shield, excluding dust and preventing any accident from exposure of rotating surfaces.

The chuck $a$, externally beveled or inclined backward and inward, as at 2, Fig. 3, is formed by splitting or slotting longitudinally a steel rod, $a^2$, in two or more places, to thus form jaws, all as usual. The rear end of this rod, which is thus formed into a chuck, is connected, in any usual manner, with the usual rotating flexible shaft commonly employed in this class of dental tools.

In the drawings, $b$ represents the wire of the said shaft.

The rod $a^2$ has a screw-thread, $a^3$, upon which is placed a nut, $c$, so that it, the rod being placed within the rotating sleeve $d$, may be turned and made to act upon the rear end of the sleeve, as shown in Fig. 1, to thus draw the rod $a^2$ inward or backward in the direction of the arrow upon it. Inward motion of the rod, as described, brings the tapering surfaces 2 of the chucking-jaws against the outer end of the rotating sleeve $d$, and causes the said jaws to approach each other and grasp and hold firmly any portion of the shank 3 of the tool $e$ to be held and rotated. This shank is round and in the original condition of the steel wire from which it is made, and the shank may be more or less long, and consequently the acting end of the tool may be made to project or extend more or less from the end of the hand-piece, according to the work to be done and the person being operated upon, which is not the case where the tool has to be held at some fixed spot upon its shank. This screw and nut just described enables me to grasp the tool with any desired force.

The rotating sleeve $d$ has its forward external end or bearing made tapering, as shown at 4, Fig. 1, to co-operate against and with a tapering holding-surface made within the outer shell or casing $f$ of the hand-piece. The rear end of this casing $f$ is provided with an internal screw-thread to receive the externally-threaded bushing $g$, having, preferably, a lock-nut, $g^2$, by which to turn it and cause the said bushing to enter more or less far into the said casing, and cause the beveled or conical end 5 to act upon the beveled or conical shoulder 6 of the rotating sleeve $d$, such adjustment of the bushing enabling me to always center the sleeve and chuck-rod $a^2$ with relation to the casing $f$ and always take up any wear in the bearings of the rotating sleeve.

The rotating sleeve $d$ is slotted at 8 to receive a screw or other pin, $h$, to thus always maintain the rod $a^2$ in the said sleeve whether a tool is or is not held by the chuck. This slot 8 is made long enough to provide all the necessary end-play for the rod and chuck to grasp and release the tool.

The sleeve $d$ is preferably enlarged, as at $d^2$, to make a more extended surface, upon which the presser $k$ may act when it is desired to arrest the rotation of the rod $a^2$ and chuck. This presser is herein shown as a block mounted upon a spring, $k^2$, attached at $k^3$ to the casing $f$, the presser extending through a slot made in the said shell. This presser is normally held by its spring out of contact with the said sleeve; but it may be depressed or forced against the said sleeve by the hand of the operator, if desired, or by the shield $l$, which I have added for that and other purposes. When this shield is moved forward, as in dotted lines, it will act upon and depress the presser upon the sleeve, as in dotted lines, and stop its rotation.

The acting face of the presser may be roughened or corrugated, as in Fig. 4, to act upon the sleeve correspondingly corrugated, or it may be smooth, or may be provided with a piece of leather or other usual friction-surface. This spring and presser substantially fill the slot in the said casing, thus excluding dust, &c., and preventing the outflow of oil, and the shield $l$, in its position shown in Fig. 1, effectually covers and shields all the moving parts outside the large end of the casing $f$.

The shield will be held in the position Fig. 1 by the free end of the presser slightly elevated by the spring.

I have provided the end of the covering for the metallic part of the flexible shafting with an externally-threaded union, $m$, upon which I place a guide, $n$, of sufficient length to always serve as a guide and holder for the rear end of the shield $l$ under all its adjustments, as when moved forward to depress the presser to stop the sleeve and withdraw or change a tool.

If desired, and I prefer so to do, this shield may be provided with one or more finger-openings, 10 12, which, when the shield is moved forward to depress the presser and stop the rotation of the sleeve, will come opposite the nuts $c$ and $g^2$; but when the sleeve is in rotation the said shield always covers the said nuts, and the openings 10 12 are then closed by the guide.

To effectually prevent the possibility of oil flowing down along the shank of the tool and into the tooth being operated upon, I have added to the end of the casing an oil-cup, $p'$, having within it an absorbent packing, $r$, the said cup having an adhesive fit upon the end of the casing.

The tapering bearing at the outer end of the sleeve may be always kept in close fit with the tapering surface of the interior of the casing $f$ by means of the bushing $g$, and all chattering or wabbling can thus be effectually prevented.

The exterior of the casing $f$ may be of any usual contour.

The pin $h$ and slot 8 afford a connection between the sleeve and rod $a^2$, by which the rod positively rotates the sleeve.

I claim—

1. The combination of the end-tapered casing $f$, the end-tapered rotating sleeve $d$, and the tapered jaws $a$ with the screw-threaded rod $a^2$, carrying the said jaws, and the adjusting and holding nut $c$, substantially as shown and described.

2. In a dental hand-piece, the outer casing, the threaded chucking rod and nuts $c\ g^2$, combined with the shield and with the guide $n$, attached to the flexible shafting, substantially as described.

In testimony whereof I have signed my name to this specification in the presence of two subscribing witnesses.

AUGUST WEBER.

Witnesses:
G. W. GREGORY,
N. E. C. WHITNEY.